United States Patent
Cimadevilla García et al.

(10) Patent No.: US 11,059,604 B2
(45) Date of Patent: Jul. 13, 2021

(54) METHOD OF ASSEMBLY OF THE STRUCTURE OF AN AIRCRAFT AND FRAME FOR CARRYING OUT SAID METHOD

(71) Applicant: ACITURRI ENGINEERING S.L.U., Valladolid (ES)

(72) Inventors: David Cimadevilla García, Valladolid (ES); Jesús Palacios Vicente, Valladolid (ES); Adrian Barcina Benito, Valladolid (ES); Javier Palacios Martínez, Valladolid (ES)

(73) Assignee: ACITURRI ENGINEERING S.L.U., Boecillo (ES)

( * ) Notice: Subject to any disclaimer, the term of this patent is extended or adjusted under 35 U.S.C. 154(b) by 69 days.

(21) Appl. No.: 16/289,915

(22) Filed: Mar. 1, 2019

(65) Prior Publication Data
US 2019/0270527 A1 Sep. 5, 2019

(30) Foreign Application Priority Data
Mar. 1, 2018 (EP) .................................... 18382127

(51) Int. Cl.
*B64F 5/10* (2017.01)
*G01C 3/08* (2006.01)

(52) U.S. Cl.
CPC . *B64F 5/10* (2017.01); *G01C 3/08* (2013.01)

(58) Field of Classification Search
CPC ............... B64F 5/10; G01C 3/08; Y02P 70/50
See application file for complete search history.

(56) References Cited

U.S. PATENT DOCUMENTS

| 4,937,768 | A | 6/1990 | Carver et al. |
| 6,583,869 | B1 * | 6/2003 | Sheridan ................. G01S 17/87 |
| | | | 356/153 |
| 7,835,810 | B2 * | 11/2010 | Mifsud ................... B23P 19/04 |
| | | | 700/98 |

(Continued)

FOREIGN PATENT DOCUMENTS

CN 101746510 B 12/2012

OTHER PUBLICATIONS

European Search Report issued in corresponding European patent application No. 18382127, dated Sep. 5, 2018.

*Primary Examiner* — John C Hong
(74) *Attorney, Agent, or Firm* — Westman, Champlin & Koehler, P.A.

(57) ABSTRACT

A method for performing the assembly of an aircraft includes, once at least first and second templates (A, B) with through holes (a, b) have been defined on a chassis, taking an initial measurement of the templates to identify the positions of the different components; measuring a laser beam to know the real coordinates through which the laser beam passes through the holes (a, b), calculating the mathematical equation of the straight line of the laser beam in order to calculate its path and target points of the elements to be assembled, performing the mathematical calculation of the point where the laser beam must strike when the element is positioned in its theoretical position, calculating the target readings which the measurement apparatus has to show when the laser is in the target point, positioning the element to be assembled following the reading of the apparatus, and fixing the element.

5 Claims, 11 Drawing Sheets

(56) References Cited

U.S. PATENT DOCUMENTS

| | | | |
|---|---|---|---|
| 8,695,219 B2 * | 4/2014 | Munk | B64F 5/10 29/897.2 |
| 8,903,516 B2 | 12/2014 | Trzcinski et al. | |
| 2003/0167147 A1 | 9/2003 | Gooch et al. | |
| 2018/0050824 A1 | 2/2018 | Regnault et al. | |

* cited by examiner

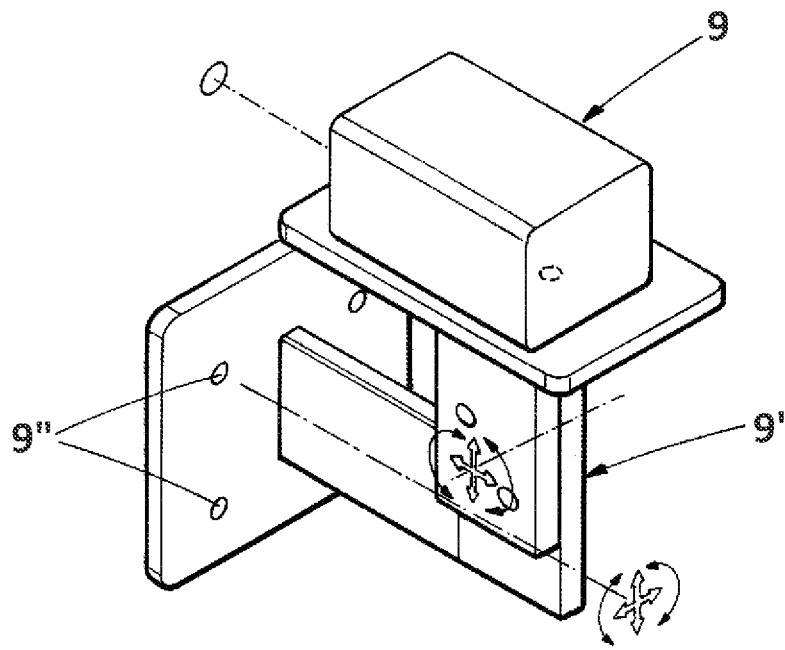
FIG. 5
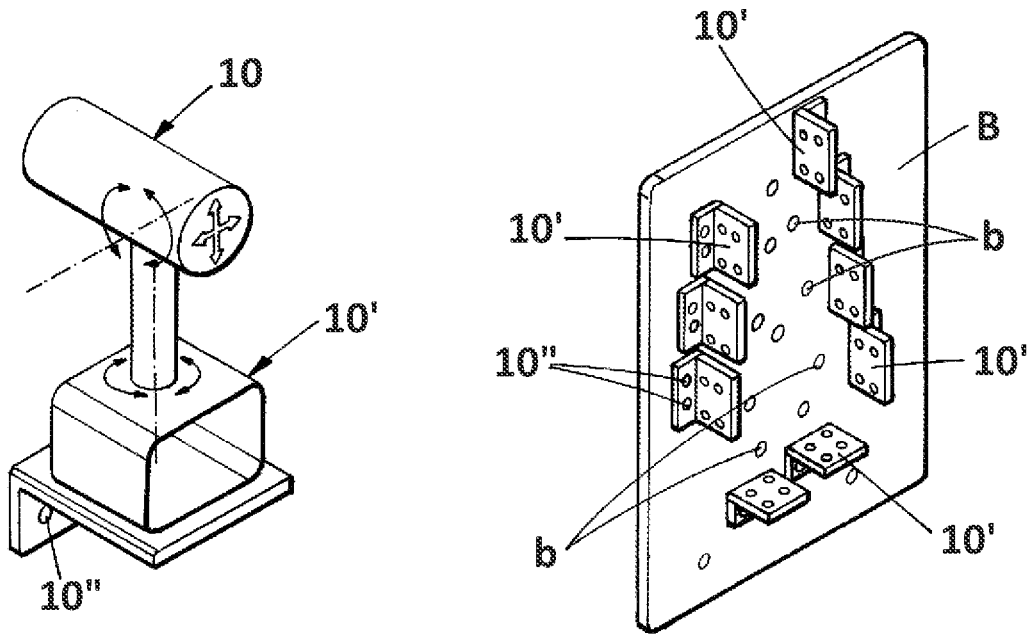
FIG. 6
FIG. 7

METHOD OF ASSEMBLY OF THE STRUCTURE OF AN AIRCRAFT AND FRAME FOR CARRYING OUT SAID METHOD

CROSS-REFERENCE TO RELATED APPLICATION(S)

The present application claims priority to European patent application EP EP18382127, filed Mar. 1, 2018, in English, the entire contents of which are hereby incorporated by reference.

FIELD OF THE INVENTION

As expressed in the title of the present specification, the present invention relates to a method for performing the assembly of the different parts or structures of an aircraft for the purpose of reducing assembly costs by means of simplifying the number and the complexity of the elements used.

Specifically, the method described in the invention follows the philosophy commonly referred to as "jigless", in which the aim is to maximally reduce or even not use any type of jig for positioning and assembling each and every one of the elements making up its structure, or to use a very small number of said elements.

Furthermore, the invention also relates to a frame with which the method of the invention is carried out in those cases in which there is no structure or structural elements on which to apply said method.

BACKGROUND OF THE INVENTION

The growing importance of air transportation is well-known, and in recent years it has become a common means of transportation for a large part of the population in the most countries around the world. This has caused the demand for new aircrafts to go up considerably, both in terms of offering new lines or services and for reinforcing those that already exist, in addition to the need to update fleets in order to replace aircrafts that are old and/or somewhat inefficient or not cost effective.

However, the extremely high cost of manufacturing these aircrafts, which leads to a sale price today that may range from about 100 M€ for the smallest versions up to and exceeding 400 M€ for the most modern, large-capacity aircrafts, such as the Airbus 380, is also well known.

Out of all these manufacturing costs, a by no means negligible part is used or is invested in assembly operations, so there has been a constant need for some time in the aeronautics industry to decrease those costs for the purpose of being more competitive. In fact, by way of example, some studies mention that in the year 1999, the costs relating to assembly operations sometimes exceeding 40% of the total cost.

Specifically, the first systems were based on various types of jigs, which supported the components and acted as auxiliary elements to aid with assembly, where each part of the structure of the aircraft had its own jig elements in what was known as a "dedicated jig". This system, however, required a long time and high cost for both the manufacture and the modification or rectification of the various jig elements.

Given that, over time, aircraft manufacturing companies had to progressively face an increasingly more varied and "customized" demand for tooling, the mentioned "dedicated tooling" systems were shown to be too expensive and inappropriate, forcing said manufacturers to introduce more flexible manufacturing systems capable of being adapted to the new demand characteristics. For this reason, more flexible assembly tools and systems of another type emerged which could be rapidly adapted to minor variations within the structure and they were reconfigurable so they could be used within one and the same family of structures, all at a competitive price.

One of these was the so-called "modular jig," which used standard profiles to build the different jigs, which made it possible to recycle the parts, and since the parts were not welded, they could be adjusted and therefore provide certain flexibility when designing said jig. This system, which was based on modularity so as to obtain the flexibility that was sought, basically consisted of creating a collection of standard parts to which the different parts could be fixed by means of standard nuts and bolts and which, as a result of different grooves, allowed adjusting them in different positions. Furthermore, said parts were often recyclable, which allowed them to be reusable in subsequent assemblies.

Nevertheless, as can be inferred from the foregoing, all these techniques or systems consisting of the use of multiple jig parts present significant problems or drawbacks.

First, the problem of said jig-based systems is their high design and manufacturing cost, which significantly increases non-recurrent costs in aircraft manufacture, i.e., said systems have been shown to be rather unsuitable for the aeronautics industry, in which the orders for each model, and particularly for higher models with a higher price/larger dimensions, do not exceed a few hundred, or even a few tens of models. So for an industry in which the current trend is furthermore to maintain a certain variety of aircraft available, and to be flexible when adapting them to the needs of clients, this form of manufacture in which each variation in manufacture involves manufacturing a new jig or adapting the existing jig is not the most cost-effective.

On the other hand, due to the strict requirements relating to precision and the very small tolerances which are worked with in the aeronautics industry, it is essential for the jig that is created to comply with said tolerances not only at the time of first use, but also in later uses. This translates into it being necessary to recalibrate each of the jig elements every time they are used, because their tolerances are affected by various factors, such as, for example, variations in temperature, blows occurring during the previous assembly, etc.

In other words, not only does the jig involve high manufacturing costs, but rather it is furthermore necessary to calibrate it and adapt it every so often or after a certain number of uses, resulting in a high cost in work hours.

Due to the foregoing, a constructive technique or philosophy the object of which was to correct the mentioned problems, i.e., reduce the cost and increase the flexibility of jig-based airplane manufacturing systems, was developed some time ago. This new technique is known as Jigless Aerospace Manufacturing (JAM).

Specifically, said technique seeks to minimize the specific jig, accessories, and tools by developing a new methodology which basically uses modular framing to allow designing assemblies as a result of a step by step process in which the already pre-machined parts are assembled with the help of robotic arms.

This technique, on the other hand, has been accompanied by considerable breakthroughs such as software simulation and programming, numerical control or industrial robotics, which have allowed obtaining increasingly more precise parts and methods such that they meet the very strict requirements of precision and quality of the aeronautics industry.

Likewise, the use of laser equipment today is common for jig measurement and calibration by measuring deviations and/or relative distances in a very precise manner, or by using so-called laser trackers to provide the coordinates of points in space with a precision of 0.05 mm, and, for example, using a robot to move components having larger dimensions and a higher weight closer to positions where the jig is located and to which jig they have to be fixed for the later definitive assembly thereof.

However, although these systems based on said laser trackers are useful for measuring and calibrating the jig or pre-positioning large elements of the structure, as already mentioned, they also suffer from at least one important drawback when they are used for the assembly of the structure per se.

Leaving aside the considerable cost of this equipment, the main drawback is that it works by means of a reflector which approaches it, detects it, and is then followed in its path to the point where its coordinate is to be measured as a result of the laser beam it emits, which means that any interruption in said beam invalidates the operation. Therefore, in the assembly of the structure of an aircraft which uses elements, jig, etc., it would be unfeasible to mark said coordinate on the structure without the beam being interrupted at some point. In other words, the laser tracker needs a diaphanous and fixed space so that the laser beam can follow the reflector, which is impossible in an assembly of this type.

However, despite the fact that considerable breakthroughs have been made since the first systems, which were not very flexible, reconfigurable, or reusable, as a result of the use of the mentioned techniques, an aircraft assembly system is still needed in the state of the art which, without undermining the precision and assuring the strict technical requirements relating to safety and quality of the aeronautics industry, even further reduces the jig to be used and the time employed, resulting in an improvement in costs, and therefore in being more competitive.

DESCRIPTION OF THE INVENTION

The system and method of the invention solve the drawbacks of the state of the art mentioned above while at the same time the strict requirements relating to precision, safety, and quality of the aeronautics industry are complied with or even improved.

In a very general manner, the invention herein described consists of a chassis on which it is possible to sequentially or consecutively position all the elements of the structure to be assembled, on which chassis at least two templates will be arranged either as an additional element or as a part thereof, which templates comprise through holes on which laser equipment is assembled in order to mark or define the exact position of all the elements of the structure to be assembled thereon.

Said chassis must be understood in the broadest sense thereof, as it could be formed by both an already assembled part of the structure on which other new elements are to be assembled and an independent frame on which the structure to be assembled is placed or fixed.

More specifically, the chassis for the assembly of structures of an aircraft according to the present invention comprises:

first and second templates, each having an inner face and an outer face, such that both templates are opposite and parallel to one another; and laser equipment in turn comprising:
        a collimator or beam emitter;
        a rangefinder or distance measuring device; and
        a coaxiality sensor wherein the first and second templates in turn comprise:
    a plurality of through holes opposite one another such that each of the through holes of the first template corresponds to a complementary through hole in the second template; and
    adjustable fastening means situated on the outer faces of both plates to position the collimator or the laser rangefinder.

Therefore, once the laser collimator and the laser rangefinder have each been positioned on one of the fastening means of each template, the beam emitted by the laser collimator goes through the through hole of its template and its complementary through hole in the other template until reaching the laser rangefinder, and where the coaxiality sensor can be placed at any point of the path of said beam for the purpose of providing the coordinates of said beam in an x and y plane.

The function of the templates is to therefore serve as of guides for determining the positions of the laser equipment, where the position of the through holes of said templates is determined by the projection on same of the different axes in turn formed by the through holes present in each of the elements (ribs, actuators, etc.) which make up the structure to be assembled. In other words, based on the virtual design or software of any part of the structure, it will be possible to design specific templates having through holes for the passage of the laser at those points which are the projection of different points of that structure.

More specifically, once the templates have been defined, arranged, integrated or assembled on the chassis, the axes defined by the complementary through holes in each template constitute the passage of the laser beam which will serve to measure distances and coaxialities during the assembly of the different elements on the frame. A much more precise assembly will thereby be achieved than with the conventional systems used up until now, which consisted of using bolts or standard elements which, when introduced through the different through holes of the components, mechanically assured the coaxiality of said through holes with a tolerance typically around several tenths of a millimeter. However, as a result of the method of the invention, said tolerance has been reduced by up to an order of magnitude, reaching hundredths of a millimeter, although it will depend in any case on the precision of the laser equipment and coaxiality sensor used.

Therefore, for example, in order to assemble a specific structure of a component of the aircraft such as an aileron, the templates are designed such that once the first element of the structure, for example a spar, is fixed on the chassis, the remaining elements forming said structure, such as ribs, skins, or coverings, etc., can be gradually fixed on same.

Therefore, to assemble each of the structures making up the aircraft, it will simply be necessary to create the templates corresponding to which the laser equipment is fixed, where the same templates could even serve for different assemblies if the design of the through holes allows it. This considerably reduces the number of parts of the assembly jig with respect to conventional systems, which results in an important reduction in assembly cost and time. Furthermore, the system and assembly of the present invention improves not only precision and the available information about the real position of the components of the structure, but rather it also allows, as a result of its special structure, simplicity, and scarce number of elements, free access for measurement elements that are outside the assembled structure.

On the other hand, the templates are designed such that they comprise the through holes required both in position and in number so that, based on said through holes and with the aid of the laser equipment, the different components can be assembled in the precise location and the relevant verifications can be performed once assembled. In other words, on one hand laser beams will be used for the assembly or construction of the structure using the through holes intended for that purpose, and on the other hand, other beams will be used to verify the correct position of the parts, the aerodynamic profile, etc., for which purpose through holes will be used, wherein the axis defined by these through holes follows the aerodynamic profile of the already assembled structure, i.e., wherein the laser beam passing through the complementary through holes of the two templates allows measuring the aerodynamic profile of the structure and thereby detecting surface deviations and corrugations.

Notwithstanding the foregoing, in order for the relative positioning between all the components of the structure to be assembled to be as close as possible to that which is theoretically defined in the design, it is necessary to parameterize their position in space. In other words, it is necessary to establish a coordinate system which, referring to a local reference, allows measuring the relative positions of all the components and thereby knowing the deviations thereof with respect to the theoretical position.

To that end, the so-called "datums" are obtained, which are references that are taken as a zero value or origin both of the chassis on which the assembly is performed and of the actual elements of the structure, based on the measurement of the jig of the invention, which will allow creating an X, Y, and Z coordinate-type reference system, such that the distances, dimensions, perpendicularity, coaxiality, parallelism, etc., between said components can be measured and referenced.

More specifically, once the chassis on which the assembly will be performed has been defined, the measurement and calibration thereof will be performed by means of the establishment of several reference points used to reference all the other points in space, thereby creating a position correction algorithm that subsequently allows correcting the relative positions of the different components of the structure as they are assembled on the chassis.

Therefore, by knowing the theoretical position that all the elements or components of the structure must have with respect to one another and the real position they occupy once they are fixed to the chassis, it will be possible to calibrate and correct the positions of said components with respect to one another and with respect to the chassis by applying the position correction algorithm.

This algorithm allows the method of the present invention to eliminate (for component assembly purposes) constructive errors, because once deviations between the different elements of the chassis and the deviation of the beam itself of the collimator with respect to the complementary through holes have been measured, these measurements are taken into account when applying the algorithm to calculate the position (coordinates) in which the different components of the structure must be situated.

From this it can be deduced that it will not be necessary, for example, for respective complementary through holes each of which is situated in each of the templates to have perfect coaxiality, or for the distance between any point of a template and its complementary point in the other template to always be the same. In other words, it will not be necessary to achieve an excessively precise fit, in the order of hundredths or thousandths of a millimeter, between the chassis and the parts making it up, because once it has been parameterized, i.e., once the spatial reference system that allows referencing any point in space with respect to same through the datum obtained has been created, the mentioned lacks of coaxiality or parallelism will also be taken into account when the components are assembled on the chassis, where their relative positions can likewise be corrected since by applying the position correction algorithm, the variation in the X, Y, and Z position that will have to be applied so as to situate the different components in the theoretical position established during the design stage may be known.

On the other hand, the present invention also relates to a method for the assembly of the structure of an aircraft based on the creation of the templates that are defined, arranged, integrated or assembled on the chassis which, as mentioned above, can be formed by a pre-assembled part of the structure or an independent frame. Therefore, once the templates for a given assembly have been designed and defined, said method comprises the following steps:

1. Taking an initial measurement of the templates. The measurement of the chassis, templates, supports, etc., is carried out in this step for the purpose of identifying the relative positions of the different components and knowing their real position.
2. Measuring the laser beam. The laser equipment is placed on two complementary through holes of the templates in this step for taking coaxiality and distance measurements of the laser beam. The real coordinates through which the laser beam passes, which are not necessarily the centers of the holes of the templates, are thereby known.
3. Performing the calculation of the straight line of the laser beam. The mathematical equation of the straight line of the laser beam of the collimator is calculated in this step. Calculations of the path of the laser beam, and therefore of the target points of the elements, can thereby be performed.
4. Performing the calculation of the target point. The point where the laser beam must strike when the element is positioned in its theoretical position is mathematically calculated in this step.
5. Performing the calculation of the target readings. The readings which the measurement apparatus have to show when the laser is in the target point calculated in the preceding step, and therefore the positioned element, are calculated in this step. It is a necessary step so that the installer can readily and directly read in the apparatus if the element is well-positioned.
6. Positioning the element. By following the reading of the apparatus of the preceding step, the operator or installer situates the element in its theoretical position, with established tolerance margins.
7. Fixing the element. Once the element has been positioned according to the preceding step, the installer fixes the element by means of a definitive fixing type, such as rivets, screws, etc.
8. Repeating the preceding steps 2 to 7 for each element until the assembly has been completed.

DESCRIPTION OF THE DRAWINGS

To complement the description that is being made and for the purpose of helping to better understand the features of the invention, a set of drawings is attached to the present specification as an integral part thereof in which the following is depicted with an illustrative and non-limiting character:

FIG. 5 shows a schematic perspective view of the laser rangefinder and its support for being secured to one of the templates.

FIG. 6 shows a schematic perspective view of the laser collimator and its support for being secured to the other template.

FIG. 7 shows a schematic drawing of one of the templates, in which the positions the supports of the collimator of FIG. 6 may adopt when they are fixed on said template are depicted.

PREFERRED EMBODIMENT OF THE INVENTION

Figure 1:
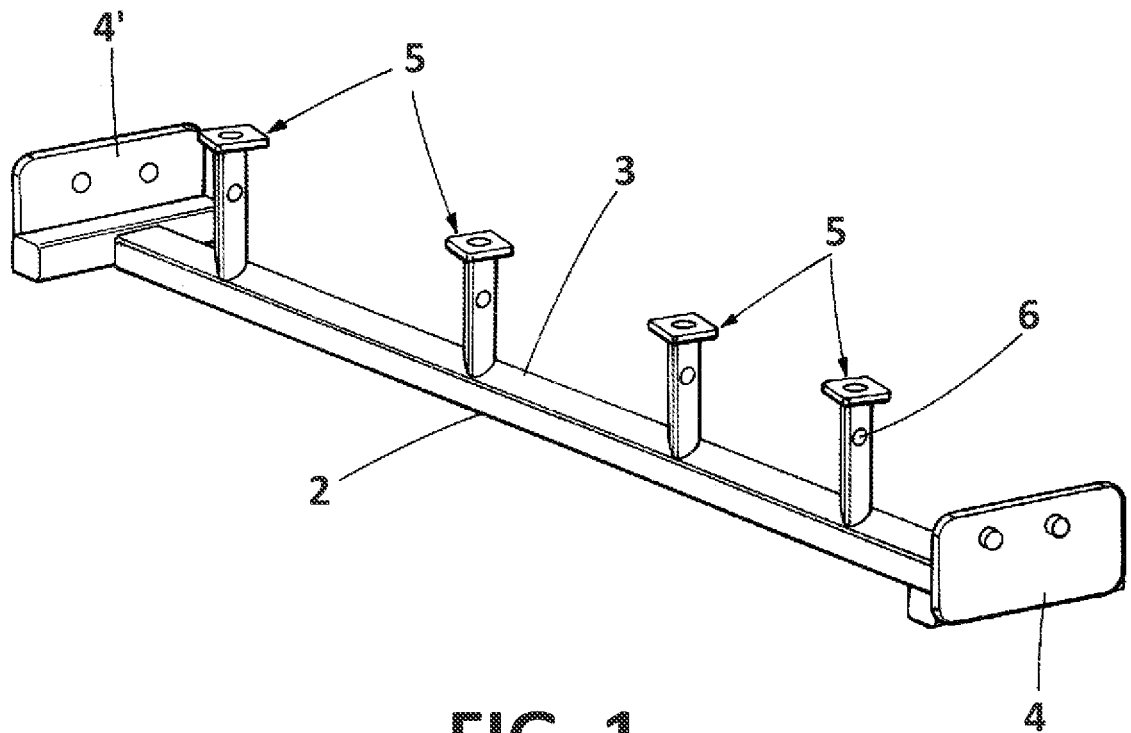
FIG. 1 shows a schematic perspective view of a possible practical embodiment in which the chassis is formed by a frame.

In view of the mentioned drawings and according to the numbering used, a preferred embodiment of the invention can be seen therein for the specific case of the assembly of an aileron (1), so for this specific case some of the elements forming them, such as spars (7), ribs (C), brackets for the actuators (8), etc., will be shown schematically.

So according to a possible embodiment of the invention shown in the drawings 1 to 12, the chassis on which the structure is assembled, and which therefore enables the application of the method of the invention, is formed by a frame comprising:

A base (2) with at least first and second ends (4, 4');
  As can be seen in the example shown in the drawings, particularly in FIG. 1, the base (2) is formed by a bar (3) or longitudinal element having said ends (4, 4').
  However, other non-depicted embodiments in which the base (2) can be cross-shaped, for example, formed by two bars (3) orthogonal to one another are not ruled out, in which case there would be up to four ends on which to assemble the templates which will be seen below. More complex assemblies and/or parts with a shape that is not essentially rectilinear, as occurs with a common aileron, could thereby be formed.
  Yet another possible embodiment could be one in which the base (2) has two bars (3) assembled parallel to one another, forming a frame with a more complex shape, or even being formed with four bars (3) positioned in space such that they form a quadrilateral, which would allow creating an assembly volume for the assembly of even more complex structures. In other words, the present invention is not limited to the base (2) being formed by a single bar (3) and the assembly being performed on a plane parallel to said bar (3), because the method of assembly derived from the use of the frame of the invention would still be applicable.

Figure 2:
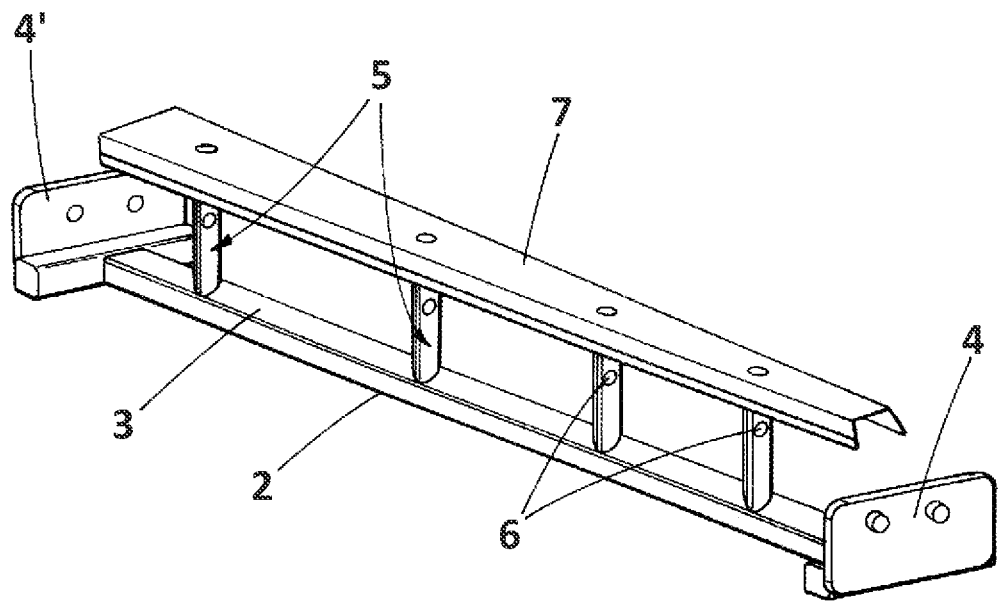
FIG. 2 shows the frame of FIG. 1 in which part of the structure is fixed.

A plurality of supports (5) attached to the base (2) situated between the first and second ends (4, 4');
  As can be seen in the drawings, particularly in FIG. 1 and FIG. 2, these supports (5) can be formed by small tubular segments which are integrally attached to the base (2) and which, as their very name indicates, serve as a support for part of the structure to be assembled, in this case, the front spar (7) of the aileron (1).
  Said supports (5) therefore have attachment means for the attachment to the structure such that the structure, i.e., the front spar (7) in the case of the example, is completely assured without the possibility of movement.
  On the other hand, despite having sufficient structural rigidity to withstand the weight of the structure, said supports (5) will have the smallest possible dimension so as not to interfere with the structure and allow the use of the jig and/or tools and/or equipment for measurement and verification throughout the entire process.
  Likewise, the supports (5) may comprise through holes (6) in their structure such that the passage of a laser ray beam is possible for taking the measurements/performing the assembly of the elements of the structure which are situated below the front spar (7), such as the actuators (8), for example.

At least first and second templates (A, B) in the form of a plate, each having an inner face and an outer face, transversely attached by their inner face to the first (4) and second end (4') of the base (2), respectively, such that both templates (A, B) are opposite and parallel to one another.

Figure 3:
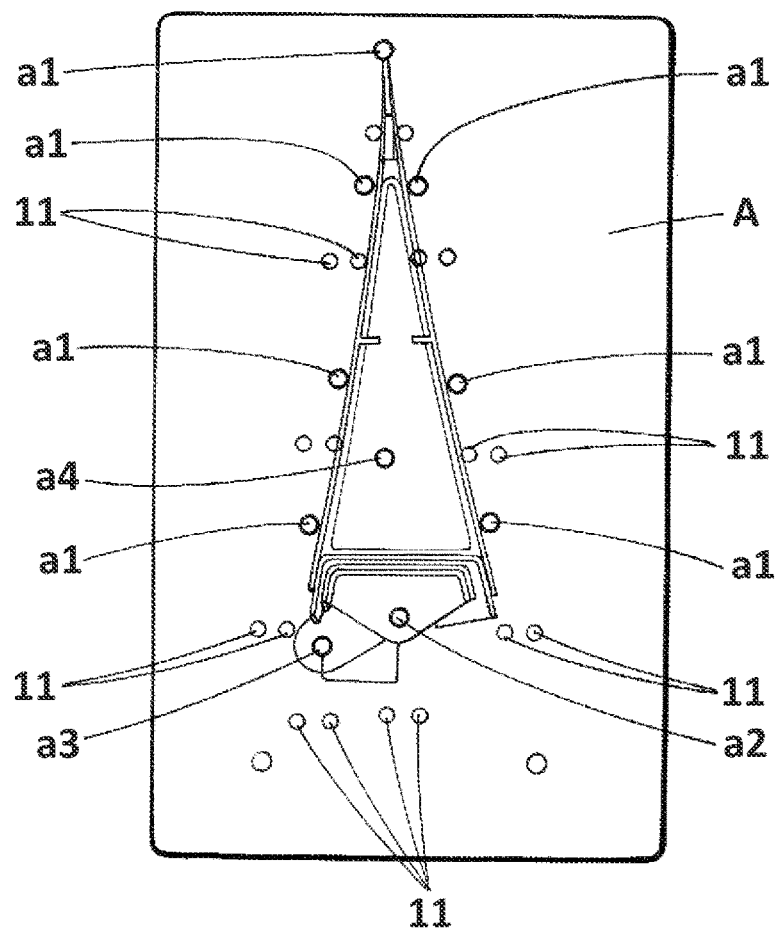
FIG. 3 shows one of the templates with a series of through holes for the example of the assembly of an aileron.
Figure 4:
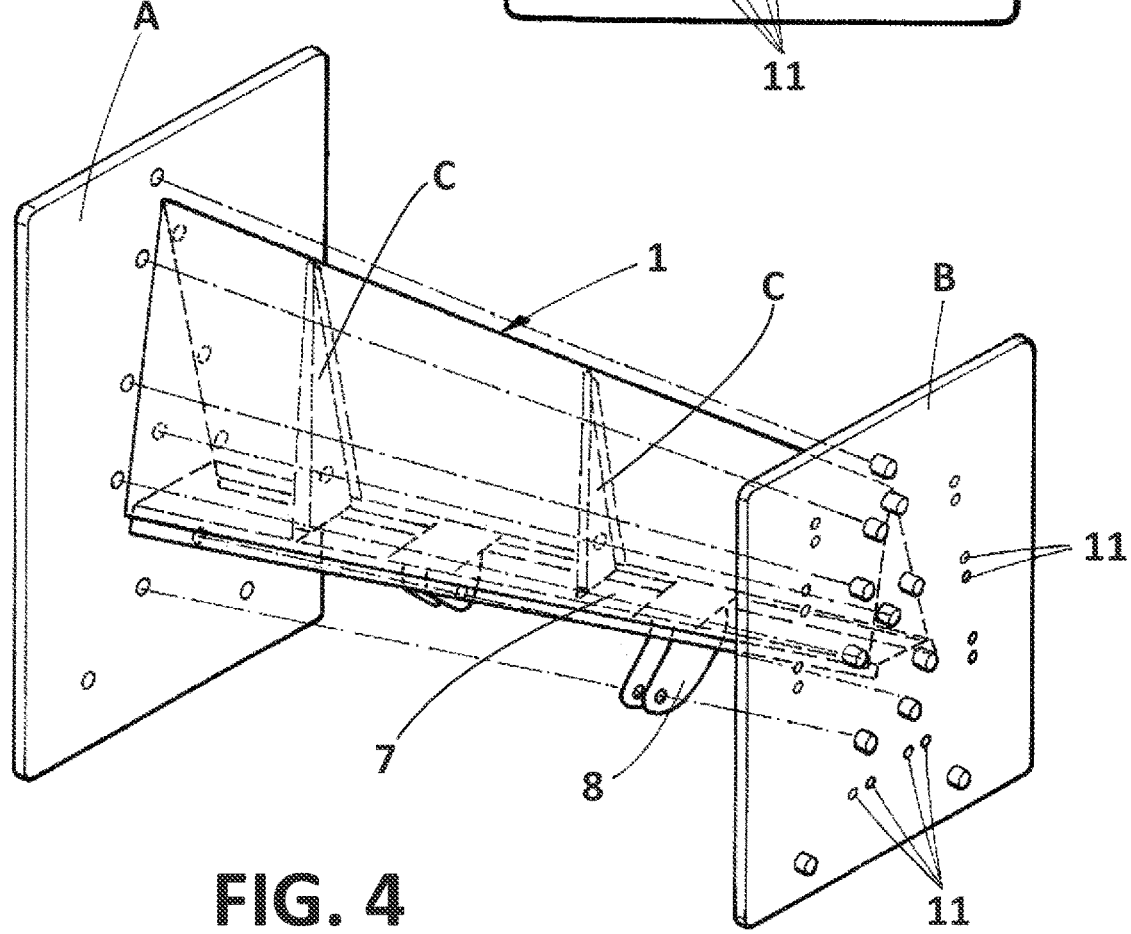
FIG. 4 shows a schematic drawing in which the frame cannot be seen but the two templates, part of the structure to be assembled, and several laser beams for assembly and verification can be seen.

One embodiment can be seen in FIGS. 3 and 4. FIG. 3 shows only a one template (A), whereas in FIG. 4 the frame of the invention with the respective templates (A, B) placed therein, and in which the assembly has already begun can be seen, where the front spar (7), a pair of ribs (C), a part marking the axis of rotation of the aileron (1), and an actuator (8) can be seen, neither the base (2) nor the supports (5) being depicted in this case for the sake of greater clarity of the drawing.

Going back to FIG. 3, there can be seen therein a front elevational view of an example of the arrangement of some of the through holes (a) used for the case of the aileron (1) shown in the present embodiment, specifically:

In that sense, the position of said through holes (a, b) in the respective templates (A, B), calculated in the design stage, is determined by the projection of the different axes in turn formed by the through holes present in each of the elements (ribs (C), actuators (8), etc.) making up the aileron (1) to be assembled, specifically:

Through holes (a1, b1) which situate the beam that will measure/verify the aerodynamic profile.

Through holes (a2, b2) which situate the beam used both to assemble the component which defines the position of the axis of rotation of the aileron and to verify the position thereof.

Through holes (a3, b3) which situate the beam used both to assemble the actuators (8) and to verify the position thereof.

Through holes (a4, b4) which situate the beam used to assemble the ribs (C) in position.

Therefore, for the case of the example, i.e., the assembly of an aileron (1), the frame will be assembled by situating a template (A, B) at each end (4, 4'), each template (A, B) being provided, respectively, with all the through holes (a, b) that were considered necessary in the design stage for the assembly and/or measurement and/or verification of the different elements making up the structure, and the position thereof, likewise calculated in the design stage, that which is defined by the projection of the different axes in turn formed by the through holes (a, b) present in each of the elements.

Figure 9:
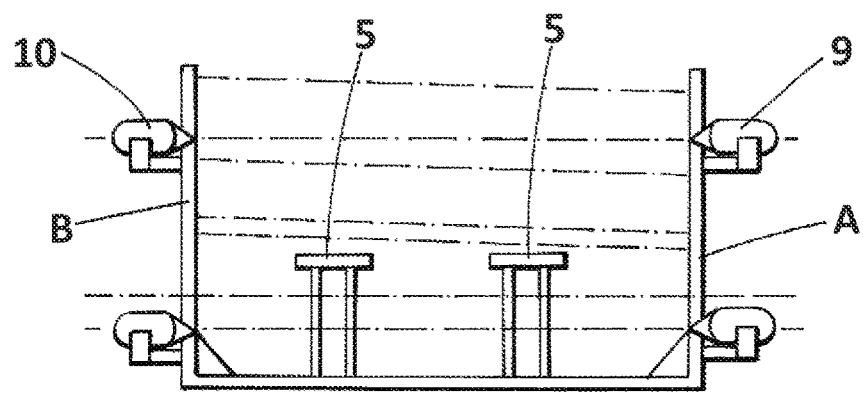
FIG. 9 shows a very schematic elevational view of the frame of FIGS. 1 to 9 to which the laser collimator and the laser rangefinder have been coupled, as well as the imaginary axes formed by the holes of the components of the structure and by the laser beams passing between complementary through holes in both templates.

Therefore, as can be seen in the drawings, particularly in FIG. 9, both templates (A, B) will comprise a plurality of through holes (a, b) opposite one another such that each of the through holes (a) of the first template (A) corresponds to a complementary through hole (b) in the second template (B) so as to allow the passage of the laser beam which, emitted by the collimator (10) associated with one of the templates (B), will reach the rangefinder (9) situated in the other template (A), which allows taking all the necessary measurements and making all the necessary adjustments.

An embodiment of both laser devices can be seen in FIGS. 5 and 6. Specifically, FIG. 5 depicts a rangefinder (9), and FIG. 6 depicts the collimator (10), each of which is situated on a specific support forming the adjustable fastening means intended for positioning and fixing both of them on the respective templates (A, B).

In this sense, FIG. 5 more specifically shows a possible embodiment of the support (9') of the rangefinder (9), which is made up of an attachment part for attachment to one of the templates (A), an attachment part for attachment to the rangefinder (9) and an adjustable element joining both parts together such that the position of one with respect to the other one can be adjusted, i.e., such that the position of the rangefinder (9) with respect to the template (A), i.e., with respect to the through hole (a) of the template (A) through which the laser beam passes, can be adjusted.

On the other hand, this adjustment must be on one hand precise enough so as to make adjustable but very precise adjustments, and on the other hand firm enough so that once a position of the rangefinder (9) has been fixed, said rangefinder (9) remains fixed and no relative movements between parts or beam deviations occur.

On the other hand, the attachment part for attachment to the template (A) will be attached to same by means of bores (9") with clearance so as to allow the adjustment between them, but like in the preceding case, once the position of the rangefinder (9) is fixed it must remain fixed and no deviations of the beam can occur.

On the other hand, FIG. 6 shows a possible embodiment of the support (10') of the collimator (10), which is made up of an attachment part for attachment to one of the templates (B), and fixed to same, an adjustable part which in turn is attached to the collimator (10), where said adjustable part allows being able to adjust the position of the collimator (10) to emit the laser beam through the corresponding through holes (b) of the template (B).

As in the case of the support (9') of the rangefinder (9), the support (10') of the collimator (10) shown in FIG. 6 must, on one hand, be precise enough so as to perform small, but very precise adjustments that can be controlled, and on the other hand firm enough so that once a position of the collimator (10) has been fixed, said collimator (10) remains fixed.

Also in the same manner, the attachment part for attaching the support (10') of the collimator (10) to the template (B) will be attached to same by means of bores (10") with clearance so as to allow the adjustment between both but assuring that once the position of the collimator (10) has been fixed, the collimator (10) must remain fixed and there cannot be any relative movements between them.

Taking the foregoing into account, according to the example shown in the drawings templates (A, B) will comprise second holes (11) cooperating with the bores (9", 10") of the supports (9',10') of the rangefinder (9) and the collimator (10), respectively, to thereby form the mentioned fastening means, which are also depicted in FIG. 3.

Figure 8:
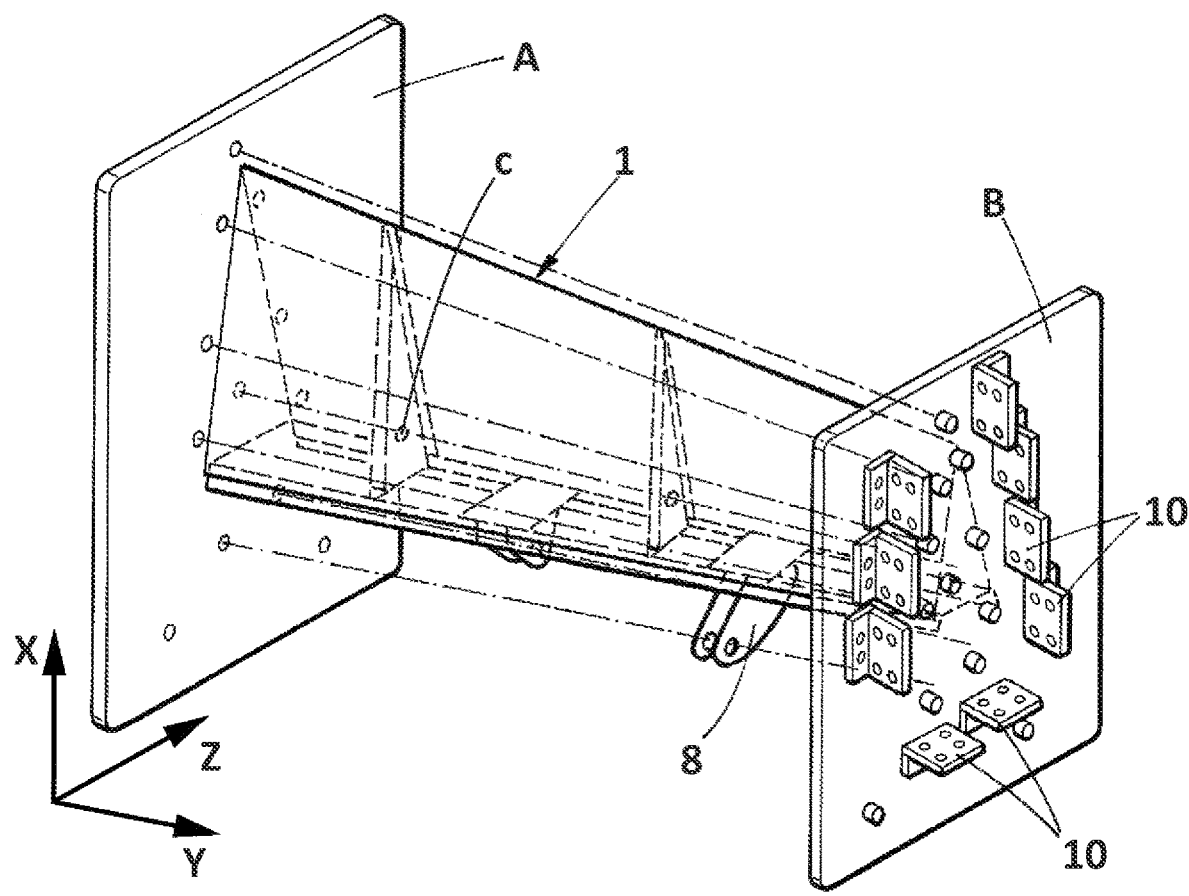
FIG. 8 shows the assembly of FIG. 4 in which one of the templates as shown in FIG. 7 is furthermore depicted.

More specifically, all the positions in which the support (10') of the collimator (10) could be fixed to one of the templates (B) (the collimator has not been depicted) to receive the light beam through the through holes (b) created for that purpose can schematically be seen in FIGS. 7 and 8.

Finally, in order to prevent errors, once the templates (A, B) have been fixed to the base (2) of the frame, it will be necessary for them to be perfectly secured such that there is no relative movement between them or between them and the base, for which reason in addition to performing a fine adjustment and assuring that both are perfectly fixed, the material from which they are made must be completely rigid, i.e., non-deformable.

Figure 10:
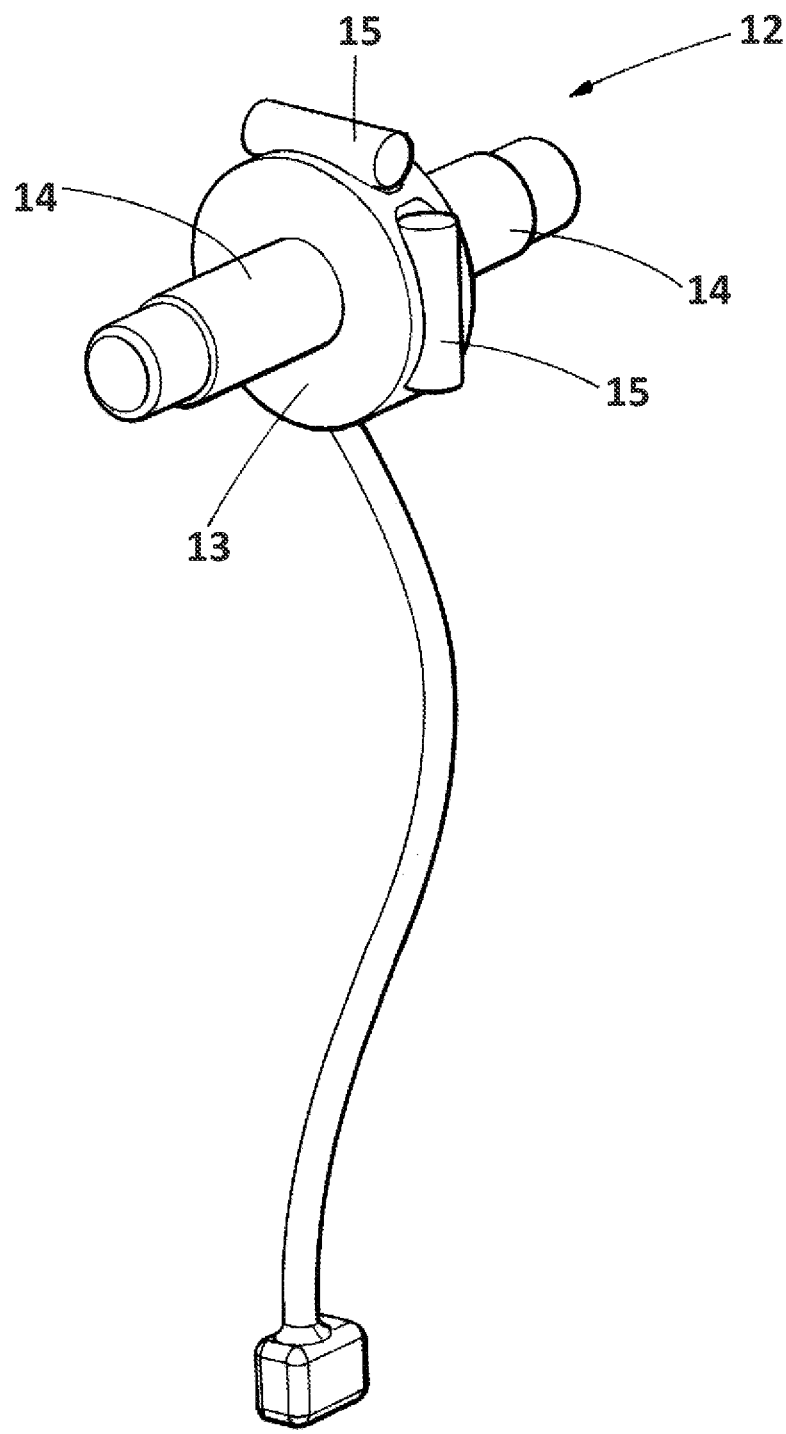
FIG. 10 shows a schematic perspective view of a coaxiality sensor for the laser collimator.

On the other hand, FIG. 10 shows a possible embodiment of a coaxiality sensor (12), i.e., a sensor to measure the position on a plane of the emitted laser beam or generated by the collimator (10) and which will be in charge of determining the degree of coaxiality of the different through holes (c) of the component elements of the structure, for example the ribs (C), in relation to said beam.

According to the possible embodiment shown in the drawing, said coaxiality sensor (12) will have an enclosure (13) for the necessary electronics, as well as respective hollow cylinders (14) which allow the laser beam to pass through to the detector situated therein, which cylinders are in turn intended for being coupled to the through holes present in each of the elements (ribs (C), actuators (8), etc.) making up the structure to be assembled in which coaxiality is to be measured. The use of sockets for the case in which cylinders (14) and through holes are different is envisaged.

Figure 11:
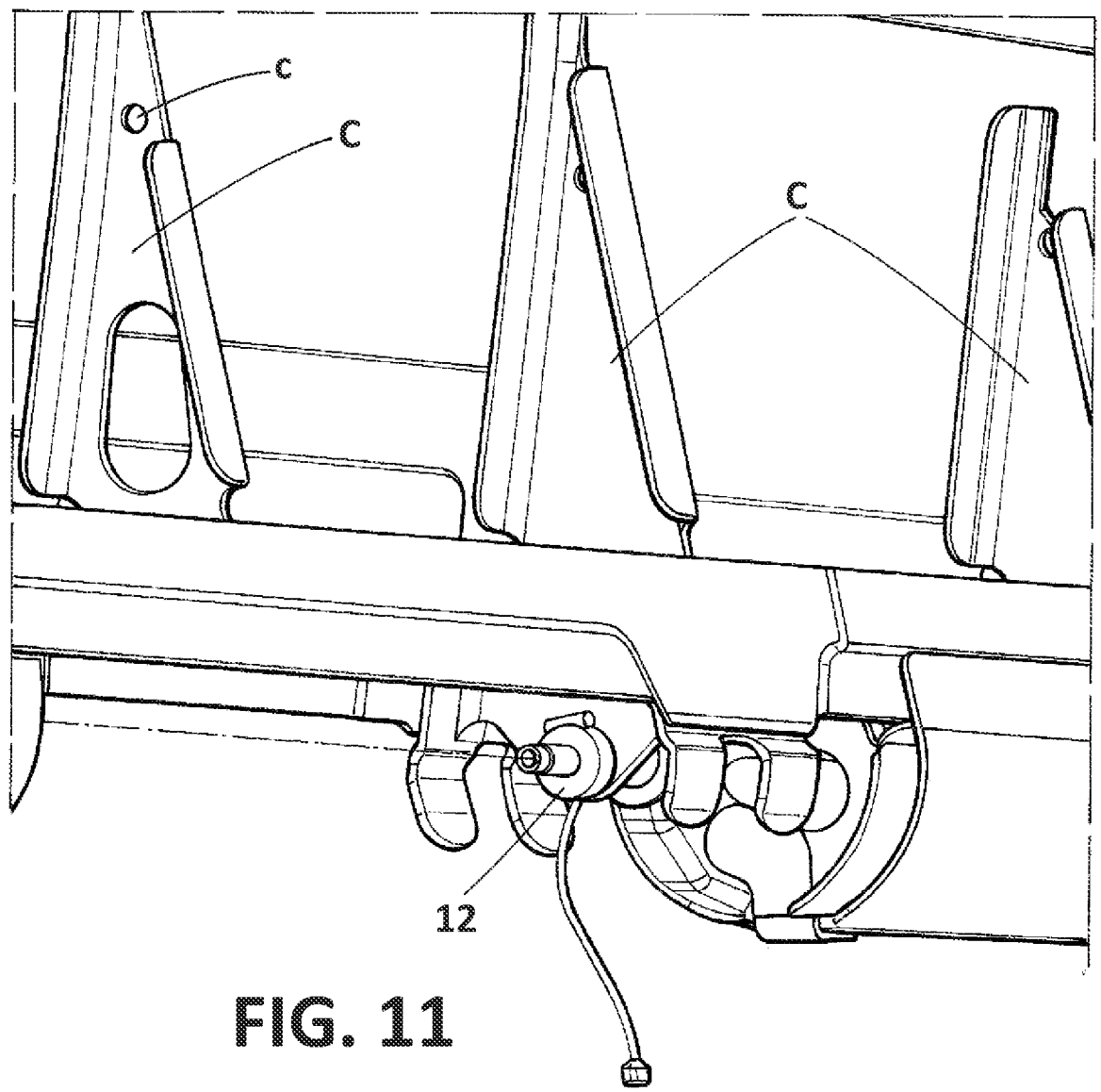
FIGS. 11, 11a and 11b show an example of the measurement of the coaxiality of respective through holes of one of the components of the structure to be assembled by means of the coaxiality sensor of FIG. 10.
Figure 11A:
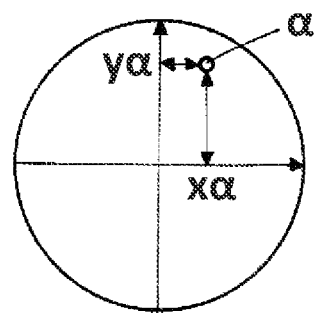

Generally depicted in FIG. 11, said coaxiality sensor (12) is placed in a first through hole of the structure, such as the one shown, for example, introducing its hollow cylinder, where once it has been positioned it will receive a laser beam that will mark a given point a with coordinates $x_\alpha$ and $y_\alpha$ in a manner similar to FIG. 11a. Then the cylinder will be introduced in the other through hole of the structure which is located in the path defined by the laser beam, obtaining a point 13 defined by the coordinates $x_\beta$ and $y_\beta$ shown in FIG. 11b. Based on those two positions, it will be possible to determine the deviation of one hole with respect to the other.

Figure 11B:
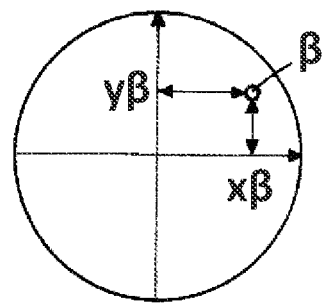

For the example shown in the drawings, the measurements of the coordinates shown in FIGS. 11a and 11b have been taken in the two lugs of a bracket to obtain the deviation of the midpoint. Once this deviation is known, the position of the bracket is corrected and coordinates a and 13 of incidence of the laser in the coaxiality sensor (12) are taken again until reaching the required position.

Therefore, if said operation is performed for through holes situated in ribs (C), by taking the first and the last ones to define a straight line the deviation of some through holes with respect to others, i.e., some ribs with respect to others and with respect to the templates (A, B) of the frame, will be obtained, where the necessary adjustments can be made to correct the position at which it is nominally defined.

According to alternative embodiments, the sensor will have level, positioning and orientation marks with respect to the Earth's axis, such that when measuring coaxiality between two through holes, the sensor is always situated in the same position with respect to the beam for the purpose of preventing errors in the measurement. Likewise, in order to help in the unequivocal positioning thereof, there may be at least one stop that helps to fix the cylinder in a given position, where even the same stop or stops can act as positioning marks.

On the other hand, said coaxiality sensor not only provides information in that sense, but it also serves as a target surface so that the rangefinder (10) can determine the distance to said point.

Figure 12:
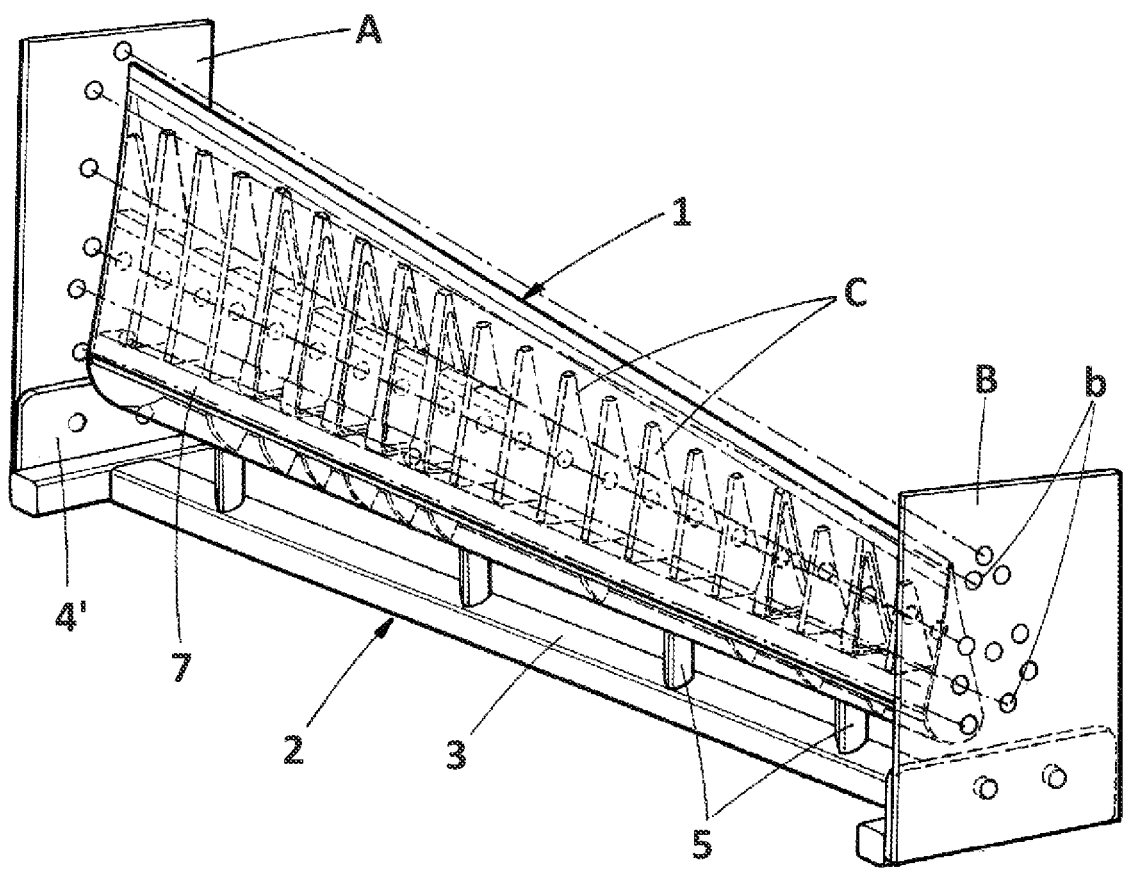
FIG. 12 shows a schematic perspective view of the templates on which the aileron has already been assembled.
Figure 13:
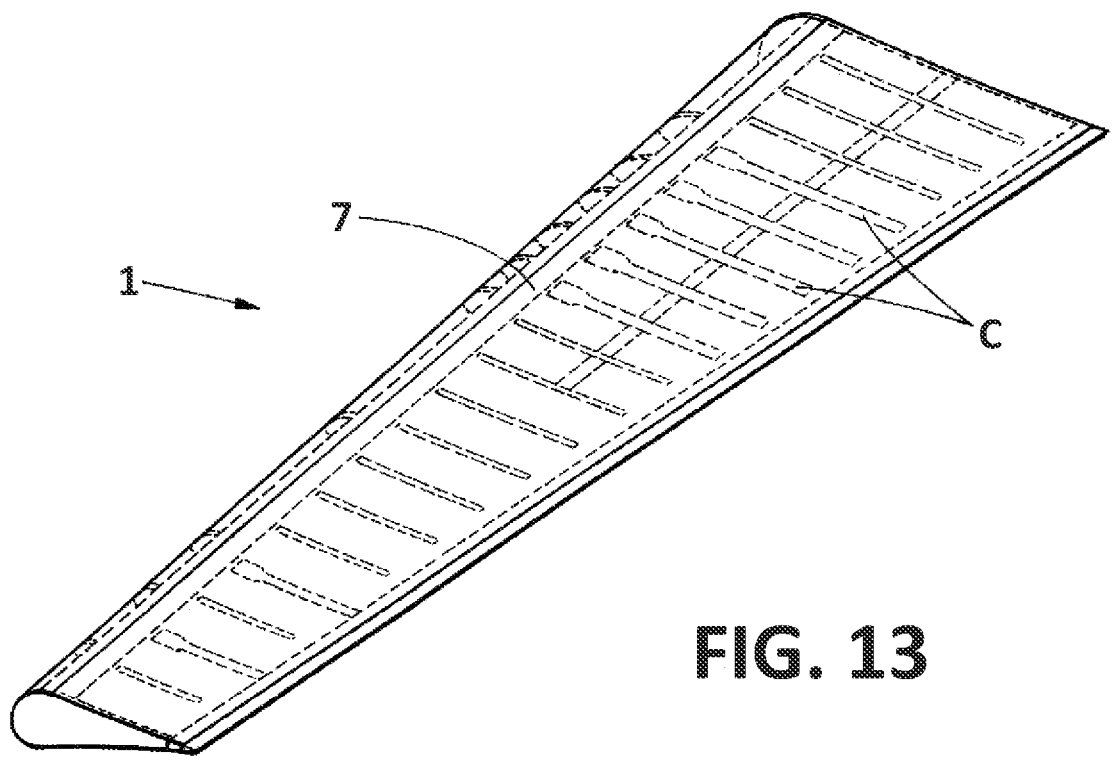
FIG. 13 shows a schematic perspective view of the already assembled aileron.

Finally, in summary, FIG. 12 shows a schematic perspective view of the frame of the invention on which the assembly of the aileron (1) of the example has already been performed, and which can be seen completely assembled and removed from the frame in FIG. 13.

Figure 19:
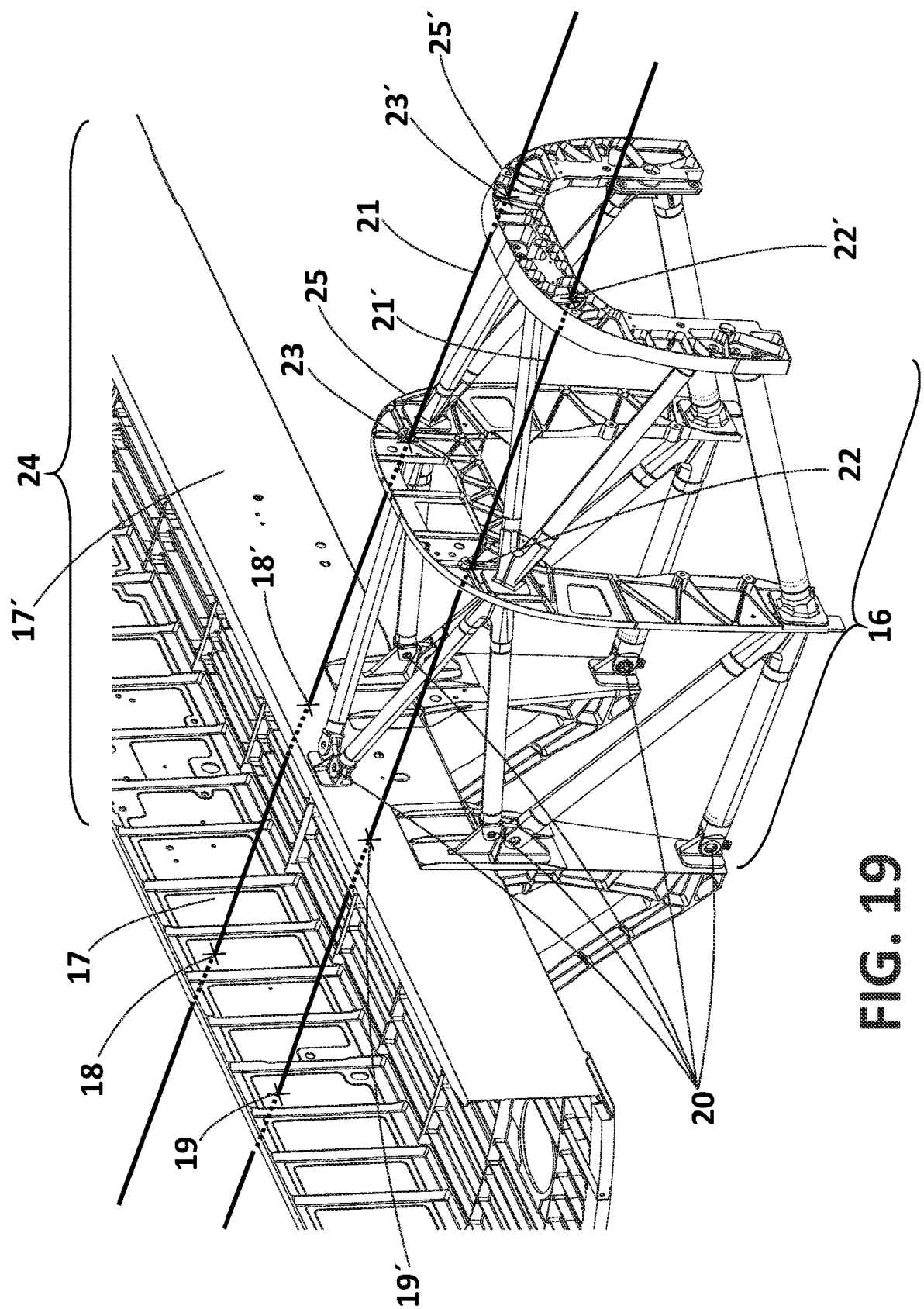
FIG. 19 shows a practical embodiment in which the chassis is formed by the attachment of the mount to the section of the wing where it is installed and where all the elements relating to the laser positioning can be seen.

On the other hand, and as already mentioned, the chassis can be formed by a part or portion of the structure itself, as in the case of the embodiment shown in FIG. 19, which shows the example of the assembly of an engine mount (16) on the section of wing (24) in which said engine is installed.

Therefore, it can be seen in said drawing how the wing (24) and the engine mount (16) have a series of attachments (20) in common that keep the assembly attached together. This attachment between the wing (24) and the engine mount (16) has certain plan until the position thereof in the assembly is locked. Up until that time the positions the engine mount (16) can have with respect to the wing (24) are infinite, where it is even possible to assemble it in one that is outside the tolerance.

To prevent this, the conventional solution is to use a jig which coordinates both products, limiting the infinite positions to just one. The use of the method of the invention is proposed as an alternative to the use of a conventional jig. Specifically, in this case the holes of the templates used for the passage of the laser beam are the bores (18, 18", 19, 19") situated or made solely for this task in the spars of the wing (17, 17"), which spars therefore act as templates (A and B). So the laser beam will be projected through these bores (18, 18", 19, 19") to subsequently apply the same method of assembly described in the present invention.

Figure 16:
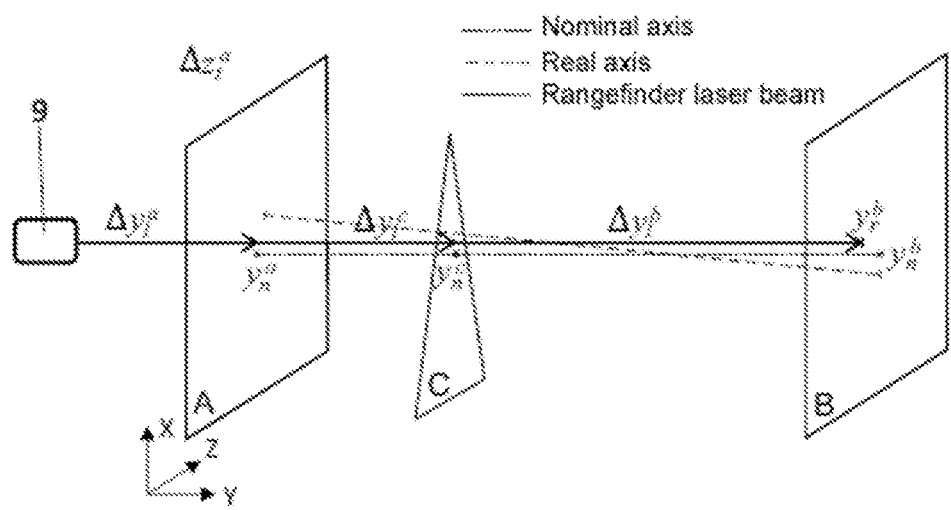
FIG. 16 schematically shows the straight lines involved in the mathematical correction of the rangefinder in the process of the assembly of element C using templates A and B by applying the method of the invention.

On the other hand, as can be seen in FIG. 16, the mount (16) is formed by a mechanically welded structure consisting of bars, brackets and two members (25, 25"). This structure will have two pick up points (22, 22", 23, 23") for the coaxiality sensor in each of the members (25, 25"), where each point of each member belongs to one of the two laser beams (21, 21").

When these 4 points (22, 22", 23, 23") are seen in plan view, they form a quadrilateral. With the relative measurement of these points with respect to their nominal positions, the inclination of the entire structure of the mount with respect to the wing will be known, where it can be manipulated until finding the required position and fixing it.

On the other hand, the present invention also relates to a method of assembly of the elements of an aircraft on a chassis, which can be formed by both an independent frame like the one described above and in FIGS. 1 to 12 and by a an already assembled part of the structure on which other new elements are to be assembled, as can be seen in FIG. 19.

More specifically, as an example of said method the method of the invention will now be described for the specific case of placing any one hole (c) of an element, for example a rib (C), in its definitive position using two complementary holes a and b in templates A and B, respectively, as shown in FIGS. 14 to 18.

To simplify the mathematical expressions, it will be assumed that the axes of the coaxiality sensor are parallel to the overall axes of measurement, where an axis change matrix has to be applied in those cases in which they are not.

1. Taking an Initial Measurement of the Templates.

As indicated above, the measurement of the chassis, frame, templates, supports etc., is carried out in this step for the purpose of identifying the relative positions of the different components and knowing their real position.

More specifically, for the embodiment now described the measurement of the spatial position of holes a and b is taken by means of any three-dimensional measurement method, such as theodolites, laser (commercially known as a laser tracker), coordinate measuring machine etc., for the purpose of identifying their real position. The coordinates of points $a_r$ and $b_r$ forming the "real axis" are thereby obtained, as can be seen in FIG. 14.

2. Measuring the Laser Beam.

In this step, the laser equipment is placed on two complementary through holes of templates A, B for taking coaxiality and distance measurements of the laser beam. The real coordinates through which the laser beam passes, which are not necessarily the centers of the holes of the templates, are thereby known.

Figure 14:
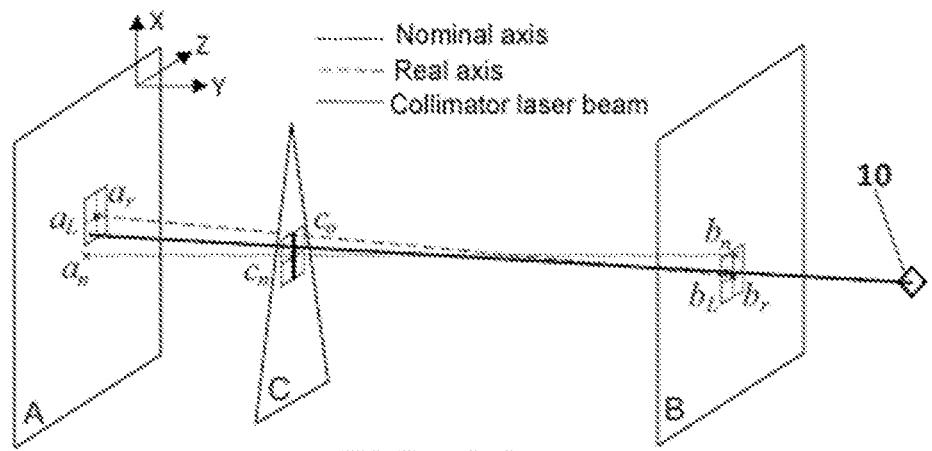
FIG. 14 schematically shows straight lines involved in the mathematical correction of the collimator and coaxiality sensor in the process of the assembly of element C using templates A and B by applying the method of the invention.
Figure 15:
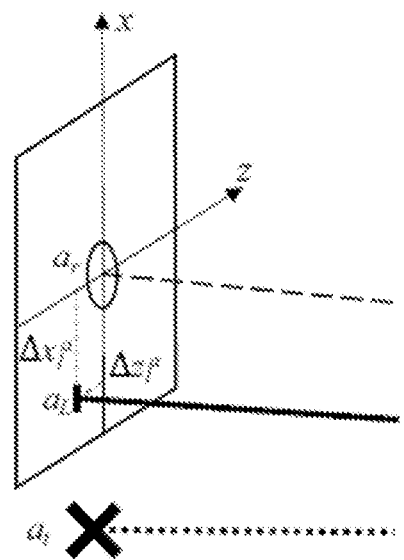
FIG. 15 schematically shows a detail of the laser beam of the collimator striking the coaxiality sensor of the method of the invention.

So for the described embodiment, the collimator (10) is placed behind the template (B) such that the laser beam first passes through one hole (b) of said plate, and then through the complementary hole (a) of the other template (A), as can schematically be seen in FIG. 14. Furthermore, though not depicted, the coaxiality sensor (12) is placed in said holes (a, b) to measure the deviations of the laser beam with respect to the measurements of the preceding step 1. The "x" and "z" coordinates of points "$a_L$" and "$b_L$", which are the points of the collimator (10) through which the laser beam passes, are thereby obtained, as can be seen in said FIG. 14. The mathematical expressions for obtaining said coordinates are the following:

$$x_L^a = x_r^a + \Delta x_I^a;\ z_L^a = z_r^a + \Delta z_I^a$$

$$x_L^b = x_r^b + \Delta x_I^b;\ z_L^b = z_r^b + \Delta z_I^b$$

Where $\Delta x_I^a$ and $\Delta z_I^a$ are the measurements of the coaxiality sensor (12) placed in hole (a) as can schematically be seen in FIG. 15.

Where $\Delta x_I^b$ and $\Delta z_I^b$ are the measurements of the coaxiality sensor (12) placed in hole (b). Where $x_r^a$, and $z_r^a$, are the x, z coordinates of hole (a) measured in step 1.

Where $x_r^b$ and $z_r^b$ are the x, z coordinates of hole (b) measured in step 1.

Where $x_L^a$ and $z_L^a$ are the x, z coordinates of the point of incidence of the laser collimator on the coaxiality sensor placed in hole (a); and.

Where $x_L^b$ and $z_L^b$ are the x, z coordinates of the point of incidence of the collimator (10) on the coaxiality sensor (12) placed in hole (b).

The rangefinder (9) is then placed behind the template (A) such that the laser beam first passes through one hole (a) of said plate, and then through the complementary hole (b) of the other template (B), as can schematically be seen in FIG. 16. Furthermore, though no depicted, a coaxiality sensor (12) is placed in holes (a, b) to measure the relative distances from them to the rangefinder (9). Taking template A as a distance reference, the y coordinates of $(a_L, b_L)$ are calculated. The mathematical expressions for obtaining said coordinates are as follows:

$$y_L^a = y_r^a$$

$$y_L^b = \Delta y_I^b - \Delta y_I^a + y_L^a$$

Where $\Delta y_I^a$ is the measurement of the rangefinder (9) with a coaxiality sensor (12) in hole (a).

Where $\Delta y_I^b$ is the measurement of the rangefinder (9) with a coaxiality sensor (12) in hole (b).

Where $y_r^a$ is the y coordinate of hole (a) measured in step 1.

Where $y_L^a$ is the y coordinate of the point of incidence of the laser rangefinder on the coaxiality sensor (12) placed in hole (a); and Where $y_L^b$, is the y coordinate of the point of incidence of the laser rangefinder on the coaxiality sensor (12) placed in hole (b).

3. Calculating the Straight Line of the Laser Beam.

The mathematical equation of the straight line of the laser beam of the collimator (10) is calculated in this step. Calculations of the path of the laser beam, and therefore of the target points of the elements, can thereby be performed.

Specifically, for the described embodiment, the y coordinates for the beam of the rangefinder (9) are equivalent to the y coordinates of the beam of the collimator (10) such that the mathematical equation of the straight line of the laser beam of the collimator (10), i.e., the mathematical straight line H passing through $(a_L, b_L)$, is calculated with the "x" and "z" coordinates of points $(a_L, b_L)$ as follows:

$$H = \left\{ \begin{array}{l} X = mY + n \\ Z = m'Y + n' \end{array} \right\}$$

$$m = \frac{x_L^a - x_L^b}{y_L^a - y_L^b};\ n = x_L^a - \frac{x_L^a - x_L^b}{y_L^a - y_L^b} y_L^a = x_L^b - \frac{x_L^a - x_L^b}{y_L^a - y_L^b} y_L^b$$

$$m' = \frac{z_L^a - z_L^b}{y_L^a - y_L^b};\ n' = z_L^a - \frac{z_L^a - z_L^b}{y_L^a - y_L^b} y_L^a = z_L^b - \frac{z_L^a - z_L^b}{y_L^a - y_L^b} y_L^b$$

Where m and m' are the slopes (inclination) of the straight line H with respect to the YZ and XY plane, respectively.

Where n and n' are the x, z coordinates, respectively, of the point of intersection of the straight line H with the XZ plane; and Where X, Y, and Z are the coordinates of any one point belonging to the straight line H.

4. Performing the Calculation of the Target Point of the Laser.

The point where the laser beam must strike when the element is positioned in its theoretical position is mathematically calculated in this step.

Specifically, for the described embodiment, the coaxiality sensor (12) is placed in hole (c). Generally the laser beam of the collimator (10) does not pass through the nominal position of hole (c), i.e., ($c_n$), which means that to take it to its nominal position, element "C" will be placed in a position in space such that the laser beam of the collimator strikes the coaxiality sensor at a point called "$c_L$," or target point, as follows:

$$y_L^c \approx y_n^c$$

Where $y_n^c$ is the y coordinate nominal or theoretical of hole (c); and

Where $y_L^c$ is the y coordinate of the point of incidence of the laser of the collimator (10) on the coaxiality sensor (12) placed in hole (c) which is to be attained so as to situate element (C).

For that value, the equations of the straight line of the laser beam for obtaining the x, z coordinates of the target point are distinguished as follows:

$$x_L^c = m \cdot y_L^c + n$$

$$z_L^c = m' \cdot y_L^c + n'$$

Where $x_L^c$ and $z_L^c$ are the x, z coordinates, respectively, of the point of incidence of the laser of the collimator (10)

on the coaxiality sensor (12) placed in hole c which is to be attained so as to situate element (C).

5. Performing the Calculation of the Target Readings.

The readings which the measurement apparatus have to show when the laser is in the target point calculated in the preceding step, and therefore the positioned element, are calculated in this step such that the installer can readily and directly read in the apparatus if the element is well-positioned.

Figure 17:
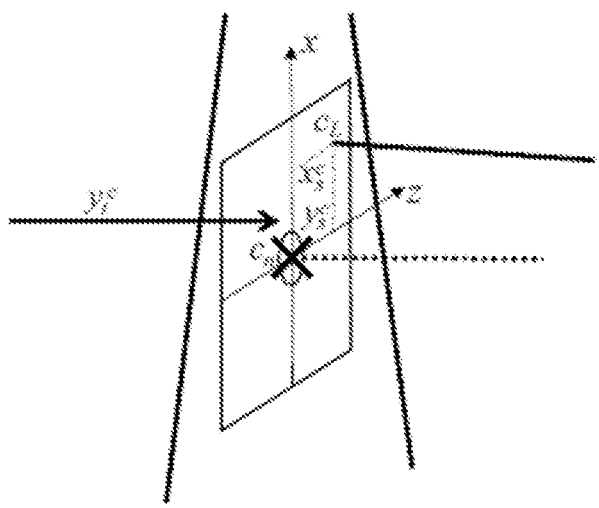
FIG. 17 schematically shows element C situated in its theoretical position with the laser beam and collimator involved in the process.

Specifically, for the described embodiment, through the coordinates of the target point the readings which the rangefinder (9) and the coaxiality sensor (12) must show when the laser has reached the target point (cc), and therefore hole (c) is situated in its nominal position, as can schematically be seen in FIG. 17, are calculated. Specifically, they are calculated as follows:

$$\Delta x_S^c = x_L^c - x_n^c$$

$$\Delta z_S^c = z_L^c - z_n^c$$

$$\Delta y_T^c = y_L^c - y_L^a + \Delta y_l^a$$

Where $\Delta x_S^c$ and $\Delta z_S^c$ are the readings that the coaxiality sensor (12) must show when the element (C) is correctly positioned in space; and Where $\Delta y_T^c$ is the reading that the rangefinder (9) must show when element (C) is correctly positioned in space.

6. Positioning the Element.

Finally, following the reading of the apparatus of the preceding step the operator or installer situates the element in its theoretical position, with the established tolerance margins.

Specifically, for the described embodiment, this step consists of shifting element (C), for this example a rib of the structure, until the values read by the coaxiality sensor (12) and the rangefinder (9) coincide with those calculated in the previous step 5.

For practical or real-life purposes, the exact value of the variables could never be reached, so one way to continue would be to establish an acceptance criterion by proximity, such as for example, of the many that may exist, comparing each reading against a maximum and minimum value.

7. Fixing of the Element.

Finally, once the element is positioned according to the preceding step 6, the installer then fixes the element by means of a definitive fixing type such as rivets, screws, etc.

Figure 18:
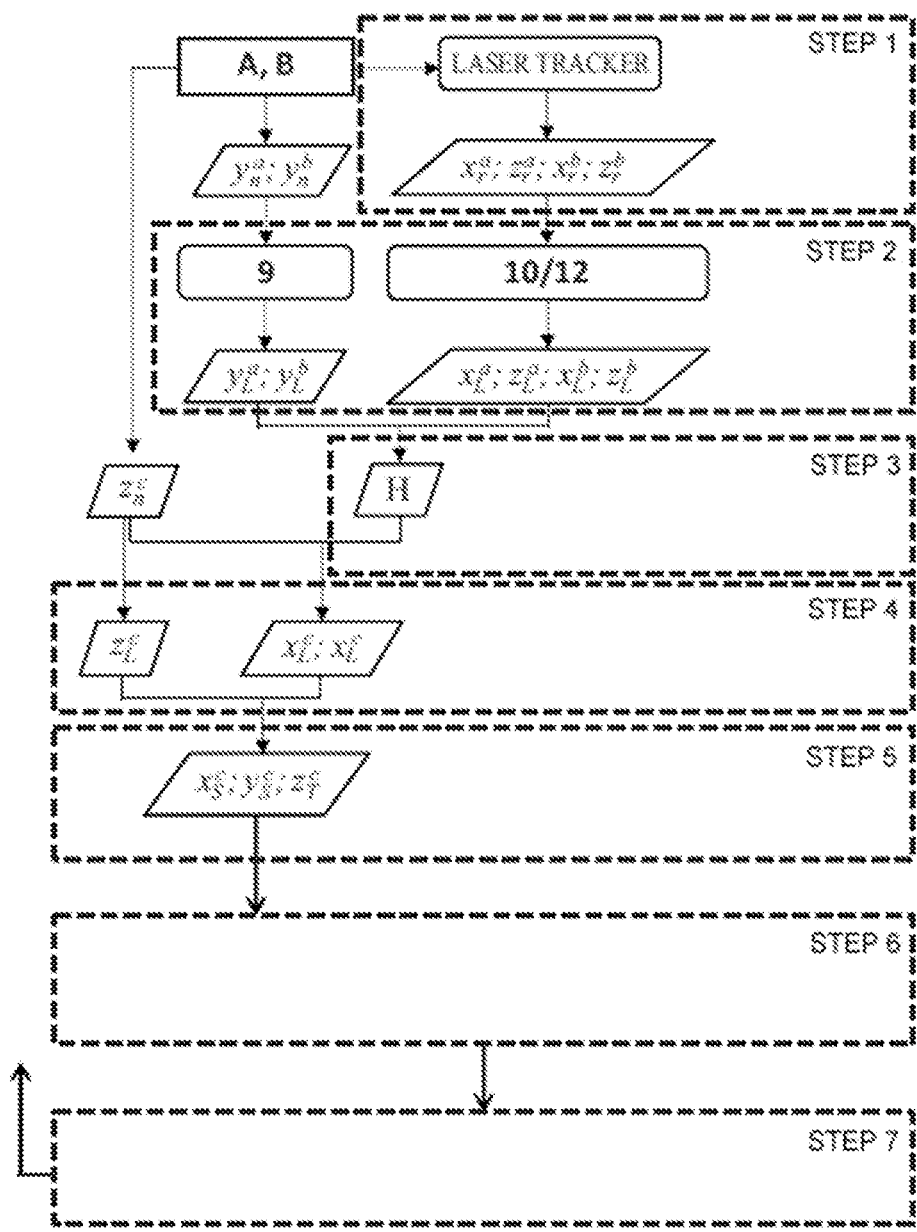
FIG. 18 shows a flowchart summarizing the method of the invention and showing the variables involved in the mathematical correction in each step for improving understanding of the mathematical method.

A schematic graphic example in the form of a block diagram of the steps of the preceding method can be seen in the flowchart of FIG. 18.

The invention claimed is:

1. A method for the assembly of elements of a structure of an aircraft using a measurement apparatus, the method comprising:
   defining on a chassis at least first and second templates (A, B) such that both are opposite and parallel to one another, where said first and second templates (A, B) in turn each comprise a plurality of through holes (a, b) such that each of the through holes of the first template corresponds to a complementary through hole in the second template; and
   where once said templates have been defined, the method further comprising:
   1) taking an initial measurement of the chassis and the first and second templates (A, B) to identify relative positions of the chassis and the first and second templates (A, B) with respect to one another and to know their real position in space, obtaining coordinates of points $a_r$ and $b_r$ of the through holes (a, b) forming a real axis;
   2) placing laser equipment on two complementary through holes of the first and second templates (A, B) for taking coaxiality and distance measurements of a laser beam obtaining real x and z coordinates of points $(a_L, b_L)$, which are points through which the laser beam passes;
   3) performing a calculation of a mathematical equation H of a straight line of the laser beam of the laser equipment passing through the points $(a_L, b_L)$, and thereby obtaining a path of the laser beam, and therefore of target points of the elements to be assembled;
   4) performing a mathematical calculation of coordinates $x_L^c$ and $z_L^c$ of the target point where the laser beam must strike when a given one (C) of the elements is positioned in its theoretical position;
   5) performing a calculation of target readings $\Delta x_S^c$ and $\Delta z_S^c$ which the measurement apparatus has to show when the laser beam is in the target point calculated in the previous step 4, such that an installer can read from the measurement apparatus whether the given element (C) is well-positioned;
   6) positioning the given element (C) until values read by a coaxiality sensor and a rangefinder of the measurement apparatus coincide with those calculated in the previous step 5;
   7) fixing the given element to the structure to be assembled with a definitive fixing type; and
   8) repeating the preceding steps 2 to 7 for each of the elements until the assembly of the structure has been completed.

2. The method for the assembly of the structure of an aircraft according to claim 1, wherein in order to obtain the real x and z coordinates of the points $a_L$ and $b_L$, through which the laser beam passes according to step 2, the method further comprises:
   placing a collimator of the laser equipment behind the second template (B) such that the laser beam first passes through one hole (b) of said second template, and then through the complementary hole (a) of the first template (A);
   placing the coaxiality sensor in said holes (a, b) to measure deviations of the laser beam with respect to the measurements of step 1 of the method;
   obtaining the x and z coordinates of the points $a_L$ and $b_L$, which are the points of the collimator through which the laser beam passes, according to the following mathematical expressions:

$$x_L^a = x_r^a + \Delta x_l^a;\ z_L^a = z_r^a + \Delta z_l^a$$

$$x_L^b = x_r^b + \Delta x_l^b;\ z_L^b = z_r^b + \Delta z_l^b$$

where $\Delta x_l^a$ and $\Delta z_l^a$ are the measurements of the coaxiality sensor placed in the hole (a),
where $\Delta x_l^b$ and $\Delta z_l^b$ are the measurements of the coaxiality sensor placed in the hole (b); where $x_r^a$ and $z_r^a$ are the x, z coordinates of the hole (a) measured in step 1 of the method,
where $x_r^b$ and $z_r^b$ are the x, z coordinates of the hole (b) measured in step 1 of the method;

where $x_L^a$ and $z_L^a$ are the x, z coordinates of a point of incidence of the laser beam of the collimator on the coaxiality sensor placed in the hole (a), and where $x_L^b$ and $z_L^b$ are the x, z coordinates of a point of incidence of the collimator on the coaxiality sensor placed in the hole (b);

placing the rangefinder of the laser equipment behind the first template (A) such that the laser beam first passes through one hole (a) of said first template, and then through the complementary hole (b) of the second template (B);

placing the coaxiality sensor in the holes (a, b) to measure relative distances from them to the rangefinder; and by taking the first template (A) as a distance reference, calculating the y coordinates of the points $(a_L, b_L)$ according to the following mathematical expressions:

$$y_L^a = y_r^a$$

$$y_L^b = \Delta y_l^b - \Delta y_l^a + y_L^a$$

where $\Delta y_l^a$ is a measurement of the rangefinder with the coaxiality sensor in the hole (a), where $\Delta y_l^b$ is a measurement of the rangefinder with the coaxiality sensor in hole (b), where $y_r^a$ is the y coordinate of the hole (a) measured in step 1 of the method, where $y_L^a$ is the y coordinate of a point of incidence of the laser rangefinder on the coaxiality sensor placed in the hole (a), and where $y_L^b$ is the y coordinate of a point of incidence of the laser rangefinder on the coaxiality sensor placed in the hole (b).

3. The method for the assembly of the structure of an aircraft according to claim 2, wherein by taking into account that the y coordinates for the laser beam of the rangefinder are equivalent to the y coordinates of the laser beam of the collimator, in order to obtain the real coordinates of the points $a_L$ and $b_L$ through which the laser beam passes according to step 2, the mathematical equation of the straight line H passing through the points $(a_L, b_L)$, is calculated as follows:

$$H = \left\{ \begin{array}{l} X = mY + n \\ Z = m'Y + n' \end{array} \right\}$$

$$m = \frac{x_L^a - x_L^b}{y_L^a - y_L^b}; n = x_L^a - \frac{x_L^a - x_L^b}{y_L^a - y_L^b} y_L^a = x_L^b - \frac{x_L^a - x_L^b}{y_L^a - y_L^b} y_L^b$$

$$m' = \frac{z_L^a - z_L^b}{y_L^a - y_L^b}; n' = z_L^a - \frac{z_L^a - z_L^b}{y_L^a - y_L^b} y_L^a = z_L^b - \frac{z_L^a - z_L^b}{y_L^a - y_L^b} y_L^b$$

where m and m' are slopes of the straight line H with respect to the YZ and XY plane, respectively;

where n and n' are the x, z coordinates, respectively, of a point of intersection of the straight line H with the XZ plane; and where X, Y, and Z are coordinates of any one point belonging to the straight line H.

4. The method for the assembly of the structure of an aircraft according to claim 1, wherein for the calculation of the $x_L^c$ and $z_L^c$ coordinates of the target point of step 4 the method further comprises:

placing the coaxiality sensor in a hole (c) and the given element (C) in a position in space such that the laser beam of a collimator of the laser equipment strikes the coaxiality sensor at a target point cL, such that:

$$y_L^c \approx y_n^c$$

where $y_n^c$ is the y coordinate nominal of the hole (c); and where $y_L^c$ is the y coordinate of a point of incidence of the laser of the collimator on the coaxiality sensor placed in the hole (c) which is to be attained so as to situate the given element (C); and wherein the equations of the straight line of the laser beam for obtaining the x, z coordinates of the target point are distinguished as follows:

$$x_L^c = m \cdot y_L^c + n$$

$$z_L^c = m' \cdot y_L^c + n'$$

where $x_L^c$ and $z_L^c$ are the x, z coordinates, respectively, of the point of incidence of the laser of the collimator on the coaxiality sensor placed in the hole (c) which is to be attained so as to situate the given element (C).

5. The method for the assembly of the structure of an aircraft according to claim 1, wherein the calculation of target readings $\Delta x_S^c$ and $\Delta z_S^c$ which the rangefinder and the coaxiality sensor must show when the laser has reached the target point $(c_L)$ and the hole (c) is therefore situated in its nominal position, are calculated as follows:

$$\Delta x_S^c = x_L^c - x_n^c$$

$$\Delta z_S^c = z_L^c - z_n^c$$

$$\Delta y_T^c = y_L^c - y_L^a + \Delta y_l^a$$

where $\Delta x_S^c$ and $\Delta z_S^c$ are the readings that the coaxiality sensor must show when the given element (C) is correctly positioned in space; and where $\Delta y_T^c$ is the reading that the rangefinder must show when the given element (C) is correctly positioned in space.

* * * * *